United States Patent
Ma et al.

(10) Patent No.: US 10,080,154 B2
(45) Date of Patent: Sep. 18, 2018

(54) MONITORING REPORT GENERATION METHOD AND APPARATUS, AND USER EQUIPMENT

(71) Applicant: HUAWEI TECHNOLOGIES CO., LTD., Shenzhen (CN)

(72) Inventors: Jie Ma, Beijing (CN); Bo Lin, Beijing (CN); Zhenzhen Cao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 176 days.

(21) Appl. No.: 15/270,700

(22) Filed: Sep. 20, 2016

(65) Prior Publication Data
US 2017/0013491 A1    Jan. 12, 2017

Related U.S. Application Data

(63) Continuation of application No. PCT/CN2014/073821, filed on Mar. 21, 2014.

(51) Int. Cl.
*H04W 24/10* (2009.01)
*H04W 72/04* (2009.01)
(Continued)

(52) U.S. Cl.
CPC ....... *H04W 24/10* (2013.01); *H04W 72/0486* (2013.01); *H04W 8/005* (2013.01); *H04W 92/18* (2013.01)

(58) Field of Classification Search
CPC . H04W 24/10; H04W 72/0486; H04W 92/18; H04W 8/005
See application file for complete search history.

(56) References Cited

U.S. PATENT DOCUMENTS

2009/0150695 A1\*  6/2009  Song .................. G06F 1/3203
                                                   713/323
2011/0103246 A1\*  5/2011  Byun .................. H04L 12/12
                                                   370/252
(Continued)

FOREIGN PATENT DOCUMENTS

CN   102118797   7/2011
CN   102792745   11/2012
(Continued)

OTHER PUBLICATIONS

International Search Report, dated Dec. 24, 2014, in International Application No. PCT/CN2014/073821 (4 pp.).
(Continued)

*Primary Examiner* — Ajay Cattungal
(74) *Attorney, Agent, or Firm* — Staas & Halsey LLP

(57) ABSTRACT

Embodiments of the present disclosure provide a monitoring report generation method where the method includes: receiving a monitoring parameter broadcast by a base station; monitoring energy of each discovery resource in a resource pool within a discovery time domain; determining a busy resource and an idle resource; and generating a monitoring report when a proportion of the busy resource or the idle resource in a predetermined quantity of consecutive discovery time domains meets a reporting condition corresponding to the busy resource or the idle resource, and sending the monitoring report to the base station. This resolves a problem in the related technology that: because D2D user equipment cannot accurately obtain a quantity of resource collision times in a cell, the base station cannot accurately learn a resource status in the cell, and it is ensured that the base station can accurately learn the resource status in the cell.

14 Claims, 6 Drawing Sheets

(51) Int. Cl.
  *H04W 92/18* (2009.01)
  *H04W 8/00* (2009.01)

(56) References Cited

U.S. PATENT DOCUMENTS

| | | | | |
|---|---|---|---|---|
| 2011/0116489 A1* | 5/2011 | Grandhi | ............... | H04W 16/04 370/338 |
| 2011/0268074 A1* | 11/2011 | Li | ................... | H04W 72/0406 370/329 |
| 2012/0243431 A1* | 9/2012 | Chen | ................ | H04W 72/0406 370/252 |
| 2013/0203429 A1* | 8/2013 | Kneckt | ............ | H04W 72/1263 455/450 |
| 2014/0149772 A1* | 5/2014 | Arora | .................. | G06F 1/3234 713/323 |
| 2014/0237476 A1* | 8/2014 | Steffen | ................ | G06F 9/505 718/103 |
| 2015/0036567 A1* | 2/2015 | Park | .................. | H04L 27/2613 370/311 |
| 2015/0121057 A1* | 4/2015 | Arora | ................. | G06F 1/3228 713/100 |
| 2015/0127733 A1* | 5/2015 | Ding | ...................... | H04W 4/08 709/204 |
| 2015/0163824 A1* | 6/2015 | Krzymien | ............ | H04W 28/18 370/338 |
| 2015/0195849 A1* | 7/2015 | Bashar | ................ | H04W 16/14 370/330 |
| 2015/0270925 A1* | 9/2015 | Lin | ...................... | H04L 1/0015 370/329 |
| 2016/0007379 A1* | 1/2016 | Seok | ................... | H04W 74/085 370/338 |
| 2016/0066349 A1* | 3/2016 | Seok | .................... | H04W 24/02 370/338 |
| 2016/0081010 A1* | 3/2016 | Seok | ................ | H04W 74/0816 370/329 |
| 2016/0105888 A1* | 4/2016 | Seok | .................... | H04W 16/10 370/329 |

FOREIGN PATENT DOCUMENTS

| | | |
|---|---|---|
| CN | 103118417 | 5/2013 |
| CN | 103229582 | 7/2013 |
| GB | 2501118 | 10/2013 |
| WO | WO2015062671 | 5/2015 |

OTHER PUBLICATIONS

Written Opinion of the International Searching Authority, dated Dec. 24, 2014, in International Application No. PCT/CN2014/073821 (7 pp.).

Extended European Search Report, dated Feb. 14, 2017, in European Application No. 14885994.5 (13 pp.).

*RAN2 considerations for Proximity Discovery*, 3GPP TSG RAN WG2 Meeting #83, Barcelona, Spain, Aug. 19-23, 2013, R2-132753 (8 pp.).

*Discussions on Type 1 Discovery Resource Allocation*, 3GPP TSG RAN WG2 Meeting #85, Prague, Czech Republic, Feb. 10-14, 2014, R2-140220, pp. 1-4.

International Search Report dated Dec. 24, 2014 in corresponding International Application No. PCT/CN2014/073821.

* cited by examiner

MONITORING REPORT GENERATION METHOD AND APPARATUS, AND USER EQUIPMENT

CROSS-REFERENCE TEMPLATES

This application is a continuation of International Application No. PCT/CN2014/073821, filed on Mar. 21, 2014, the disclosure of which is hereby incorporated by reference in its entirety.

TECHNICAL FIELD

The present disclosure relates to the field of network technologies, and in particular, to a discovery monitoring report generation method and apparatus, and user equipment.

BACKGROUND

A D2D (Devic to Device, device-to-device) communications technology is a technology used by D2D user equipments in an LTE-A (Long Term Evolution-Advanced, Long Term Evolution Advanced) system to directly perform end-to-end communication by multiplexing resources of cellular users in a cell. Because an evolved NodeB eNB (evolved Node B, evolved NodeB) in the LTE-A system does not monitor a status of resources used by D2D user equipment, to prevent incapability of performing communication by the D2D user equipment with insufficient resources, the D2D user equipment needs to report the monitored resource status to the evolved NodeB, so that the evolved NodeB can perform, according to the received resource status, proper scheduling on the resources used by the D2D user equipment.

In a traditional process of monitoring a resource status, the D2D user equipment monitors a discovery resource of a cell. When the D2D user equipment cannot parse a received signal on a discovery resource, the D2D user equipment marks one resource collision, and counts a quantity of resource collision times in a discovery time domain, and reports the quantity of resource collision times to the evolved NodeB as a monitoring report.

In a process of implementing the present disclosure, the related technology at least has the following disadvantages: there is a relatively large quantity of causes of a failure in correctly parsing a received signal by the D2D user equipment, for example, occurrence of a collision, extremely poor channel quality, or interference from a nearby frequency, and the D2D user equipment may possibly also mark, as resource collision, a status in which a received signal cannot be correctly parsed due to extremely poor channel quality or interference from a nearby frequency, the quantity of resource collision times that is determined by the D2D user equipment is inaccurate; consequently, the evolved NodeB cannot accurately learn a resource status in the cell.

SUMMARY

To resolve a problem in a related technology that: because D2D user equipment cannot accurately obtain a quantity of resource collision times in a cell, the base station cannot accurately learn a resource status in the cell, embodiments of the present disclosure provide a discovery monitoring report generation method and apparatus, and user equipment. The technical solutions are as follows:

According to a first aspect, a monitoring report generation apparatus is provided, applied to user equipment in a device-to-device D2D communications system, where the apparatus includes:

a receiving module, configured to receive a monitoring parameter broadcast by a base station, where the monitoring parameter includes an energy threshold corresponding to a busy resource, a reporting condition corresponding to the busy resource, an energy threshold corresponding to an idle resource, a reporting condition corresponding to the idle resource, a resource pool, and a discovery time domain used to indicate that the user equipment performs monitoring;

a monitoring module, configured to monitor energy of at least one discovery resource in the resource pool within the at least one discovery time domain;

a determining module, configured to determine a busy resource and an idle resource in the at least one discovery time domain according to the energy of the at least one of the discovery resource, the energy threshold corresponding to the busy resource, and the energy threshold corresponding to the idle resource;

a first generation module, configured to generate a monitoring report when a proportion of the busy resource in a predetermined quantity of consecutive discovery time domains in the at least one discovery time domain meets the reporting condition corresponding to the busy resource, or when a proportion of the idle resource in consecutive discovery time domains in the at least one discovery time domain meets the reporting condition corresponding to the idle resource, where the monitoring report includes the proportion of the busy resource in the consecutive discovery time domains or the proportion of the idle resource in the consecutive discovery time domains; and a sending module, configured to send the monitoring report to the base station.

In a first possible implementation manner of the first aspect, the busy resource is a discovery resource whose energy is greater than the energy threshold corresponding to the busy resource, and the idle resource is a discovery resource whose energy is less than the energy threshold corresponding to the idle resource.

With reference to the first aspect or the first possible implementation manner of the first aspect, in a second possible implementation manner, the apparatus further includes:

a first calculation module, configured to calculate a proportion of the busy resource in each discovery time domain.

With reference to the first aspect, the first possible implementation manner of the first aspect, or the second possible implementation manner of the first aspect, in a third possible implementation manner, the first calculation module includes:

a first counting unit, configured to count a quantity of the busy resource and a quantity of the idle resource in each discovery time domain; and a first calculation unit, configured to divide the quantity of the busy resource by a sum of the quantity of the busy resource and the quantity of the idle resource, to obtain the proportion of the busy resource in each discovery time domain; or a second counting unit, configured to count a quantity of the busy resource and a quantity of the idle resource in each subframe of each discovery time domain; a second calculation unit, configured to divide the quantity of the busy resource in each of all the subframes by a sum of the quantity of the busy resource and the quantity of the idle resource, to obtain a proportion of the busy resource in each of all the subframes; and a third calculation unit, configured to calculate a weighted average value of the proportion of the busy resource in each subframe of each discovery time domain, to obtain the proportion of the busy resource in each discovery time domain.

With reference to the first aspect, or at least one of the first possible implementation manner of the first aspect to the third possible implementation manner of the first aspect, in a fourth possible implementation manner, the apparatus further includes:

a second calculation module, configured to calculate a proportion of the idle resource in each discovery time domain.

With reference to the first aspect, or at least one of the first possible implementation manner of the first aspect to the fourth possible implementation manner of the first aspect, in a fifth possible implementation manner, the second calculation module includes:

a third counting unit, configured to count a quantity of the busy resource and a quantity of the idle resource in each discovery time domain; and a fourth calculation unit, configured to divide the quantity of the idle resource by a sum of the quantity of the busy resource and the quantity of the idle resource, to obtain the proportion of the idle resource in each discovery time domain; or a fourth counting unit, configured to count a quantity of the busy resource and a quantity of the idle resource in each subframe of each discovery time domain; a fifth calculation unit, configured to divide the quantity of the idle resource in each of all the subframes by a sum of the quantity of the busy resource and the quantity of the idle resource, to obtain a proportion of the idle resource in each of all the subframes; and a sixth calculation unit, configured to calculate a weighted average value of the proportion of the idle resource in each subframe of each discovery time domain, to obtain the proportion of the idle resource in each discovery time domain.

With reference to the first aspect, or at least one of the first possible implementation manner of the first aspect to the fifth possible implementation manner of the first aspect, in a sixth possible implementation manner, when the predetermined quantity is 1, the monitoring report includes the proportion of the busy resource in the discovery time domain or the proportion of the busy resource in the discovery time domain; or when the predetermined quantity is greater than 1, the monitoring report includes a weighted average value of the proportion of the busy resource in the predetermined quantity of consecutive discovery time domains or a weighted average value of the proportion of the idle resource in the predetermined quantity of consecutive discovery time domains.

With reference to the first aspect, or at least one of the first possible implementation manner of the first aspect to the sixth possible implementation manner of the first aspect, in a seventh possible implementation manner, the monitoring report further includes a quantity of success times and a quantity of failure times, the quantity of success times is obtained by counting a quantity of times of existence of idle resource selection in each discovery time domain, and the quantity of failure times is obtained by counting a quantity of times of nonexistence of idle resource selection in each discovery time domain.

With reference to the first aspect, or at least one of the first possible implementation manner of the first aspect to the seventh possible implementation manner of the first aspect, in an eighth possible implementation manner, the monitoring parameter further includes a predetermined probability threshold, and the apparatus further includes:

a second generation module, configured to generate a random number; and the sending module is further configured to: when the random number is greater than the predetermined probability threshold, send the monitoring report to the base station.

According to a second aspect, user equipment is provided, where the user equipment is in a device-to-device D2D communications system, and the user equipment includes a receiver, a processor, and a transmitter, where:

the receiver is configured to receive a monitoring parameter broadcast by a base station, where the monitoring parameter includes an energy threshold corresponding to a busy resource, a reporting condition corresponding to the busy resource, an energy threshold corresponding to an idle resource, a reporting condition corresponding to the idle resource, a resource pool, and a discovery time domain used to indicate that the user equipment performs monitoring;

the processor is configured to monitor energy of at least one discovery resource in the resource pool within the at least one discovery time domain;

the processor is further configured to determine a busy resource and an idle resource in the at least one discovery time domain according to the energy of the at least one discovery resource, the energy threshold corresponding to the busy resource, and the energy threshold corresponding to the idle resource;

the processor is further configured to generate a monitoring report when a proportion of the busy resource in a predetermined quantity of consecutive discovery time domains in the at least one discovery time domain meets the reporting condition corresponding to the busy resource, or when a proportion of the idle resource in consecutive discovery time domains in the at least one discovery time domain meets the reporting condition corresponding to the idle resource, where the monitoring report includes the proportion of the busy resource in the consecutive discovery time domains or the proportion of the idle resource in the consecutive discovery time domains; and the transmitter is configured to send the monitoring report to the base station.

In a first possible implementation manner of the second aspect, the busy resource is a discovery resource whose energy is greater than the energy threshold corresponding to the busy resource, and the idle resource is a discovery resource whose energy is less than the energy threshold corresponding to the idle resource.

With reference to the second aspect or the first possible implementation manner of the second aspect, in a second possible implementation manner, the processor is further configured to calculate a proportion of the busy resource in each discovery time domain.

With reference to the second aspect, the first possible implementation manner of the second aspect, or the second possible implementation manner of the second aspect, in a third possible implementation manner, the processor is further configured to count a quantity of the busy resource and a quantity of the idle resource in each discovery time domain; and the processor is further configured to divide the quantity of the busy resource by a sum of the quantity of the busy resource and the quantity of the idle resource, to obtain the proportion of the busy resource in each discovery time domain; or the processor is further configured to count a quantity of the busy resource and a quantity of the idle resource in each subframe of each discovery time domain; the processor is further configured to divide the quantity of the busy resource in each of all the subframes by a sum of the quantity of the busy resource and the quantity of the idle resource, to obtain a proportion of the busy resource in each of all the subframes; and the processor is further configured to calculate a weighted average value of the proportion of the busy resource in each subframe of each discovery time domain, to obtain the proportion of the busy resource in each discovery time domain.

With reference to the second aspect, or at least one of the first possible implementation manner of the second aspect to the third possible implementation manner of the second aspect, in a fourth possible implementation manner, the processor is further configured to calculate a proportion of the idle resource in each discovery time domain.

With reference to the second aspect, or at least one of the first possible implementation manner of the second aspect to the fourth possible implementation manner of the second aspect, in a fifth possible implementation manner, the processor is further configured to count a quantity of the busy resource and a quantity of the idle resource in each discovery time domain; and the processor is further configured to divide the quantity of the idle resource by a sum of the quantity of the busy resource and the quantity of the idle resource, to obtain the proportion of the idle resource in each discovery time domain; or the processor is further configured to count a quantity of the busy resource and a quantity of the idle resource in each subframe of each discovery time domain; the processor is further configured to divide the quantity of the idle resource in each of all the subframes by a sum of the quantity of the busy resource and the quantity of the idle resource, to obtain a proportion of the idle resource in each of all the subframes; and the processor is further configured to calculate a weighted average value of the proportion of the idle resource in each subframe of each discovery time domain, to obtain the proportion of the idle resource in each discovery time domain.

With reference to the second aspect, or at least one of the first possible implementation manner of the second aspect to the fifth possible implementation manner of the second aspect, in a sixth possible implementation manner, when the predetermined quantity is 1, the monitoring report includes the proportion of the busy resource in the discovery time domain or the proportion of the busy resource in the discovery time domain; or when the predetermined quantity is greater than 1, the monitoring report includes a weighted average value of the proportion of the busy resource in the predetermined quantity of consecutive discovery time domains or a weighted average value of the proportion of the idle resource in the predetermined quantity of consecutive discovery time domains.

With reference to the second aspect, or at least one of the first possible implementation manner of the second aspect to the sixth possible implementation manner of the second aspect, in a seventh possible implementation manner, the monitoring report further includes a quantity of success times and a quantity of failure times, the quantity of success times is obtained by counting a quantity of times of existence of idle resource selection in each discovery time domain, and the quantity of failure times is obtained by counting a quantity of times of nonexistence of idle resource selection in each discovery time domain.

With reference to the second aspect, or at least one of the first possible implementation manner of the second aspect to the seventh possible implementation manner of the second aspect, in an eighth possible implementation manner, the monitoring parameter further includes a predetermined probability threshold, the processor is further configured to generate a random number; and the transmitter is further configured to: when the random number is greater than the predetermined probability threshold, send the monitoring report to the base station.

According to a third aspect, a monitoring report generation method is provided, applied to user equipment in a device-to-device D2D communications system, where the method includes:

receiving a monitoring parameter broadcast by a base station, where the monitoring parameter includes an energy threshold corresponding to a busy resource, a reporting condition corresponding to the busy resource, an energy threshold corresponding to an idle resource, a reporting condition corresponding to the idle resource, a resource pool, and a discovery time domain used to indicate that the user equipment performs monitoring;

monitoring energy of at least one discovery resource in the resource pool within the at least one discovery time domain;

determining a busy resource and an idle resource in the at least one discovery time domain according to the energy of the at least one discovery resource, the energy threshold corresponding to the busy resource, and the energy threshold corresponding to the idle resource; and generating a monitoring report when a proportion of the busy resource in consecutive discovery time domains in the at least one discovery time domain meets the reporting condition corresponding to the busy resource, or when a proportion of the idle resource in consecutive discovery time domains in the at least one discovery time domain meets the reporting condition corresponding to the idle resource, and sending the monitoring report to the base station, where the monitoring report includes the proportion of the busy resource in the consecutive discovery time domains or the proportion of the idle resource in the consecutive discovery time domains.

In a first possible implementation manner of the third aspect, the busy resource is a discovery resource whose energy is greater than the energy threshold corresponding to the busy resource, and the idle resource is a discovery resource whose energy is less than the energy threshold corresponding to the idle resource.

With reference to the third aspect or the first possible implementation manner of the third aspect, in a second possible implementation manner, after the determining a busy resource and an idle resource in the at least one discovery time domain, the method further includes:

calculating a proportion of the busy resource in each discovery time domain.

With reference to the third aspect, the first possible implementation manner of the third aspect, or the second possible implementation manner of the third aspect, in a third possible implementation manner, the calculating a proportion of the busy resource in each discovery time domain includes:

counting a quantity of the busy resource and a quantity of the idle resource in each discovery time domain, and dividing the quantity of the busy resource by a sum of the quantity of the busy resource and the quantity of the idle resource, to obtain the proportion of the busy resource in each discovery time domain; or counting a quantity of the busy resource and a quantity of the idle resource in each subframe of each discovery time domain, dividing the quantity of the busy resource in each of all the subframes by a sum of the quantity of the busy resource and the quantity of the idle resource, to obtain a proportion of the busy resource in each of all the subframes, and calculating a weighted average value of the proportion of the busy resource in each subframe of each discovery time domain, to obtain the proportion of the busy resource in each discovery time domain.

With reference to the third aspect, or at least one of the first possible implementation manner of the third aspect to the third possible implementation manner of the third aspect, in a fourth possible implementation manner, after the determining a busy resource and an idle resource in the at least one discovery time domain, the method further includes:

calculating a proportion of the idle resource in each discovery time domain.

With reference to the third aspect, or at least one of the first possible implementation manner of the third aspect to the fourth possible implementation manner of the third aspect, in a fifth possible implementation manner, the calculating a proportion of the idle resource in each discovery time domain includes:

counting a quantity of the busy resource and a quantity of the idle resource in each discovery time domain, and dividing the quantity of the idle resource by a sum of the quantity of the busy resource and the quantity of the idle resource, to obtain the proportion of the idle resource in each discovery time domain; or counting a quantity of the busy resource and a quantity of the idle resource in each subframe of each discovery time domain, dividing the quantity of the idle resource in each of all the subframes by a sum of the quantity of the busy resource and the quantity of the idle resource, to obtain a proportion of the idle resource in each of all the subframes, and calculating a weighted average value of the proportion of the idle resource in each subframe of each discovery time domain, to obtain the proportion of the idle resource in each discovery time domain.

With reference to the third aspect, or at least one of the first possible implementation manner of the third aspect to the fifth possible implementation manner of the third aspect, in a sixth possible implementation manner, when the predetermined quantity is 1, the monitoring report includes the proportion of the busy resource in the discovery time domain or the proportion of the busy resource in the discovery time domain; or when the predetermined quantity is greater than 1, the monitoring report includes a weighted average value of the proportion of the busy resource in the predetermined quantity of consecutive discovery time domains or a weighted average value of the proportion of the idle resource in the predetermined quantity of consecutive discovery time domains.

With reference to the third aspect, or at least one of the first possible implementation manner of the third aspect to the sixth possible implementation manner of the third aspect, in a seventh possible implementation manner, the monitoring report further includes a quantity of success times and a quantity of failure times, the quantity of success times is obtained by counting a quantity of times of existence of idle resource selection in each discovery time domain, and the quantity of failure times is obtained by counting a quantity of times of nonexistence of idle resource selection in each discovery time domain.

With reference to the third aspect, or at least one of the first possible implementation manner of the third aspect to the seventh possible implementation manner of the third aspect, in an eighth possible implementation manner, the monitoring parameter further includes a predetermined probability threshold, and the method further includes:

generating a random number; and when the random number is greater than the predetermined probability threshold, executing the step of sending the monitoring report to the base station.

Beneficial effects of the technical solutions provided in the embodiments of the present disclosure are as follows:

Energy of each discovery resource in a resource pool is monitored within a discovery time domain; and it is determined, according to the energy of each discovery resource, whether a proportion of a busy resource or an idle resource in the discovery time domain meets a corresponding reporting condition, a monitoring report is generated by using the proportion of the busy resource or the idle resource when the reporting condition is met, and the monitoring report is sent to a base station. This resolves a problem in the related technology that: because D2D user equipment cannot accurately obtain a quantity of resource collision times in a cell, the base station cannot accurately learn a resource status in the cell. Because the D2D user equipment may accurately monitor energy of a discovery resource, and determine a monitoring report according to the energy of the discovery resource, the monitoring report reported to the base station may relatively accurately reflect the resource status in the cell, and it is ensured that the base station can accurately learn the resource status in the cell.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the present disclosure clearer, the following further describes the embodiments of the present disclosure in detail with reference to the accompanying drawings.

Figure 1:
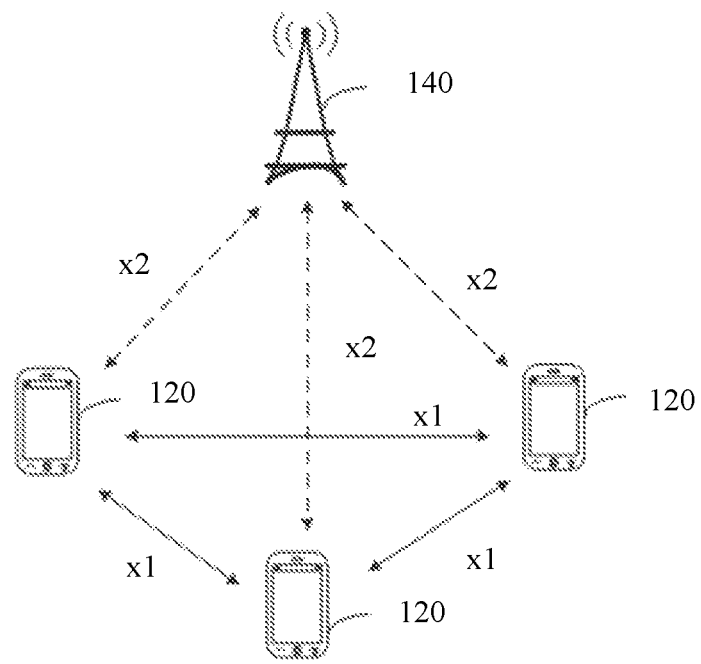
FIG. 1 is a schematic diagram of an implementation environment involved in a monitoring report generation method according to some embodiments of the present disclosure.

Referring to FIG. 1, FIG. 1 is a schematic diagram of an implementation environment involved in a monitoring report generation method according to some embodiments of the present disclosure. The implementation environment may be a device-to-device D2D communications system, and the D2D communications system may include user equipment 120 and a base station 140.

The base station 140 may allocate a resource to the user equipment 120, and may deliver data to the user equipment 120 (that is, data is delivered to the user equipment 120 through a path indicated by x2 in the figure). The user equipment 120 may be D2D user equipment, that is, communication may be directly performed between user equipments 120 by using the resource allocated by the base station 140 (that is, communication is directly performed through a path indicated by x1 in the figure).

Figure 2:
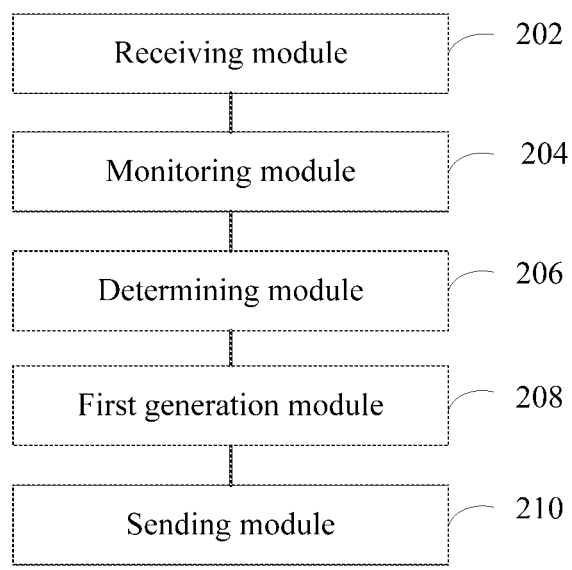
FIG. 2 is a schematic structural diagram of a monitoring report generation apparatus according to an embodiment of the present disclosure.

Referring to FIG. 2, FIG. 2 is a schematic structural diagram of a monitoring report generation apparatus according to an embodiment of the present disclosure. The monitoring report generation apparatus is mainly applied to the user equipment 120 in the implementation environment shown in FIG. 1 as an example for description. The monitoring report generation apparatus may include a receiving module 202, a monitoring module 204, a determining module 206, a first generation module 208, and a sending module 210.

The receiving module 202 may be configured to receive a monitoring parameter broadcast by a base station, where the monitoring parameter includes an energy threshold corresponding to a busy resource, a reporting condition corresponding to the busy resource, an energy threshold corresponding to an idle resource, a reporting condition corresponding to the idle resource, a resource pool, and a discovery time domain used to indicate that the user equipment performs monitoring.

The monitoring module 204 may be configured to monitor energy of at least one discovery resource in the resource pool within at least one discovery time domain.

The determining module 206 may be configured to determine a busy resource and an idle resource in the at least one discovery time domain according to the energy of the at least one discovery resource, the energy threshold corresponding to the busy resource, and the energy threshold corresponding to the idle resource.

The first generation module 208 may be configured to generate a monitoring report when a detection result in the at least one discovery time domain is that a proportion of the busy resource in a predetermined quantity of consecutive discovery time domains meets the reporting condition corresponding to the busy resource, or when a proportion of the idle resource in consecutive discovery time domains in the at least one discovery time domain meets the reporting condition corresponding to the idle resource, where the monitoring report includes the proportion of the busy resource in the consecutive discovery time domains or the proportion of the idle resource in the consecutive discovery time domains.

The sending module 210 is configured to send the monitoring report to the base station.

In conclusion, the monitoring report generation apparatus provided in this embodiment of the present disclosure monitors energy of each discovery resource in a resource pool within a discovery time domain; and determines, according to the energy of each discovery resource, whether a proportion of a busy resource or an idle resource in the discovery time domain meets a corresponding reporting condition, generates a monitoring report by using the proportion of the busy resource or the idle resource when the reporting condition is met, and sends the monitoring report to a base station. This resolves a problem in the related technology that: because D2D user equipment cannot accurately obtain a quantity of resource collision times in a cell, the base station cannot accurately learn a resource status in the cell. Because the D2D user equipment may accurately monitor energy of a discovery resource, and determine a monitoring report according to the energy of the discovery resource, the monitoring report reported to the base station may relatively accurately reflect the resource status in the cell, and it is ensured that the base station can accurately learn the resource status in the cell.

Figure 3:
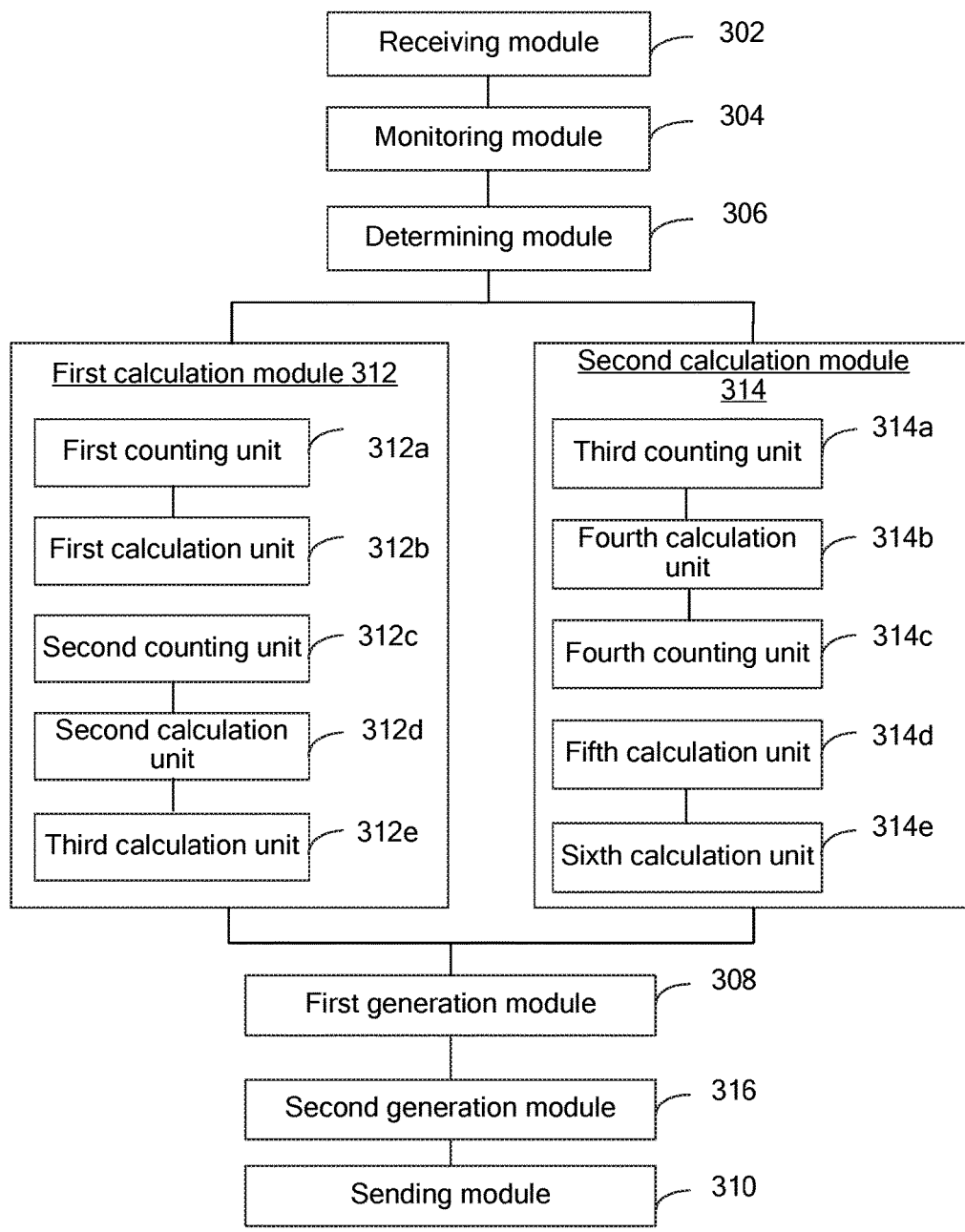
FIG. 3 is a schematic structural diagram of a monitoring report generation apparatus according to another embodiment of the present disclosure.

Referring to FIG. 3, FIG. 3 is a schematic structural diagram of a monitoring report generation apparatus according to an embodiment of the present disclosure. The monitoring report generation apparatus is mainly applied to the user equipment 120 in the implementation environment shown in FIG. 1 as an example for description. The monitoring report generation apparatus may include a receiving module 302, a monitoring module 304, a determining module 306, a first generation module 308, and a sending module 310.

The receiving module 302 may be configured to receive a monitoring parameter broadcast by a base station, where the monitoring parameter includes an energy threshold corresponding to a busy resource, a reporting condition corresponding to the busy resource, an energy threshold corresponding to an idle resource, a reporting condition corresponding to the idle resource, a resource pool, and a discovery time domain used to indicate that the user equipment performs monitoring.

The monitoring module 304 may be configured to monitor energy of at least one discovery resource in the resource pool within at least one discovery time domain.

The determining module 306 may be configured to determine a busy resource and an idle resource in the at least one discovery time domain according to the energy of the at least one discovery resource, the energy threshold corresponding to the busy resource, and the energy threshold corresponding to the idle resource.

The first generation module 308 may be configured to generate a monitoring report when a proportion of the busy resource in a predetermined quantity of consecutive discovery time domains in the at least one discovery time domain meets the reporting condition corresponding to the busy resource, or when a proportion of the idle resource in consecutive discovery time domains in the at least one discovery time domain meets the reporting condition corresponding to the idle resource, where the monitoring report includes the proportion of the busy resource in the consecutive discovery time domains or the proportion of the idle resource in the consecutive discovery time domains.

The sending module 310 may be configured to send the monitoring report to the base station.

In a first possible implementation manner of the embodiment shown in FIG. 3, the busy resource is a discovery resource whose energy is greater than the energy threshold corresponding to the busy resource, and the idle resource is a discovery resource whose energy is less than the energy threshold corresponding to the idle resource.

In a second possible implementation manner of the embodiment shown in FIG. 3, the monitoring report generation apparatus may further include a first calculation module 312.

The first calculation module 312 may be configured to calculate a proportion of the busy resource in each discovery time domain.

In a third possible implementation manner of the embodiment shown in FIG. 3, the first calculation module 312 may include a first counting unit 312a and a first calculation unit 312b; or a second counting unit 312c, a second calculation unit 312d, and a third calculation unit 312e.

The first counting unit 312a may be configured to count a quantity of the busy resource and a quantity of the idle resource in each discovery time domain; the first calculation unit 312b may be configured to divide the quantity of the busy resource by a sum of the quantity of the busy resource and the quantity of the idle resource, to obtain the proportion of the busy resource in each discovery time domain; or the second counting unit 312c may be configured to count a quantity of the busy resource and a quantity of the idle resource in each subframe of each discovery time domain; the second calculation unit 312d may be configured to: for each subframe, divide the quantity of the busy resource in each subframe by a sum of the quantity of the busy resource and the quantity of the idle resource, to obtain a probability of the busy resource in each subframe; and the third calculation unit 312e may be configured to calculate a weighted average value of the probability of the busy resource in each subframe of each discovery time domain, to obtain the probability of the busy resource in each discovery time domain.

In a fourth possible implementation manner of the embodiment shown in FIG. 3, the monitoring report generation apparatus module may further include a second calculation module 314.

The second calculation module 314 may be configured to calculate a proportion of the idle resource in each discovery time domain.

In a fifth possible implementation manner of the embodiment shown in FIG. 3, the second calculation module 314 includes a third counting unit 314a and a fourth calculation unit 314b; or a fourth counting unit 314c, a fifth calculation unit 314d, and a sixth calculation unit 314e.

The third counting unit 314a is configured to count a quantity of the busy resource and a quantity of the idle resource in each discovery time domain; the fourth calculation unit 314b is configured to divide the quantity of the idle resource by a sum of the quantity of the busy resource and the quantity of the idle resource, to obtain the proportion of the idle resource in each discovery time domain; or the fourth counting unit 314c is configured to count a quantity of the busy resource and a quantity of the idle resource in each subframe of each discovery time domain; the fifth calculation unit 314d is configured to divide the quantity of the idle resource in each subframe by a sum of the quantity of the busy resource and the quantity of the idle resource, to obtain a proportion of the idle resource in each subframe; the sixth calculation unit 314e is configured to calculate a weighted average value of the proportion of the idle resource in each subframe of each discovery time domain, to obtain the proportion of the idle resource in each discovery time domain.

In a sixth possible implementation manner of the embodiment shown in FIG. 3, when the predetermined quantity is 1, the monitoring report includes the proportion of the busy resource in the discovery time domain or the proportion of the idle resource in the discovery time domain; or when the predetermined quantity is greater than 1, the monitoring report includes a weighted average value of the proportion of the busy resource in the predetermined quantity of consecutive discovery time domains or a weighted average value of the proportion of the idle resource in the predetermined quantity of consecutive discovery time domains.

In a seventh possible implementation manner of the embodiment shown in FIG. 3, the monitoring report further includes a quantity of success times and a quantity of failure times, the quantity of success times is obtained by counting a quantity of times of existence of idle resource selection in each discovery time domain, and the quantity of failure times is obtained by counting a quantity of times of nonexistence of idle resource selection in each discovery time domain.

In an eighth possible implementation manner of the embodiment shown in FIG. 3, the monitoring parameter further includes a predetermined probability threshold, and the monitoring report generation apparatus may further include a second generation module 316.

The second generation module 316 may be configured to generate a random number.

The sending module 310 may be further configured to: when the random number is greater than the predetermined probability threshold, send the monitoring report to the base station.

In conclusion, the monitoring report generation apparatus provided in this embodiment of the present disclosure monitors energy of each discovery resource in a resource pool within each discovery time domain; and determines, according to the energy of each discovery resource, whether a proportion of a busy resource or an idle resource in each discovery time domain meets a corresponding reporting condition, generates a monitoring report by using the proportion of the busy resource or the idle resource when the reporting condition is met, and sends the monitoring report to a base station. This resolves a problem in the related technology that: because D2D user equipment cannot accurately obtain a quantity of resource collision times in a cell, the base station cannot accurately learn a resource status in the cell. Because the D2D user equipment may accurately monitor energy of a discovery resource, and determine a monitoring report according to the energy of the discovery resource, the monitoring report reported to the base station may relatively accurately reflect the resource status in the cell, and it is ensured that the base station can accurately learn the resource status in the cell.

Figure 4:
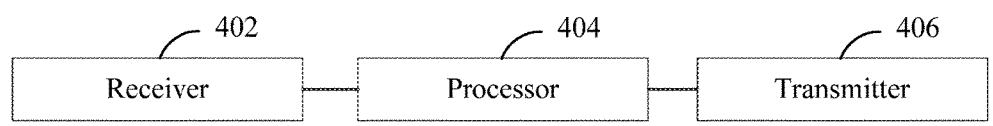
FIG. 4 is a schematic structural diagram of user equipment according to an embodiment of the present disclosure.

Referring to FIG. 4, FIG. 4 is a schematic structural diagram of user equipment according to an embodiment of the present disclosure. The user equipment is mainly applied to the user equipment 120 in the implementation environment shown in FIG. 1 as an example for description. The user equipment may include a receiver 402, a processor 404, and a transmitter 406.

The receiver 402 may be configured to receive a monitoring parameter broadcast by a base station, where the monitoring parameter includes an energy threshold corresponding to a busy resource, a reporting condition corresponding to the busy resource, an energy threshold corresponding to an idle resource, a reporting condition corresponding to the idle resource, a resource pool, and a discovery time domain used to indicate that the user equipment performs monitoring.

The processor 404 may be configured to monitor energy of at least one discovery resource in the resource pool within at least one discovery time domain.

The processor 404 may be further configured to determine a busy resource and an idle resource in the at least one discovery time domain according to the energy of the at least one discovery resource, the energy threshold corresponding to the busy resource, and the energy threshold corresponding to the idle resource.

The processor 404 may be further configured to generate a monitoring report when a proportion of the busy resource in a predetermined quantity of consecutive discovery time domains in the at least one discovery time domain meets the reporting condition corresponding to the busy resource, or when a proportion of the idle resource in consecutive discovery time domains in the at least one discovery time domain meets the reporting condition corresponding to the idle resource, where the monitoring report includes the proportion of the busy resource in the consecutive discovery time domains or the proportion of the idle resource in the consecutive discovery time domains.

The transmitter 406 may be configured to send the monitoring report to the base station.

In conclusion, the user equipment provided in this embodiment of the present disclosure monitors energy of each discovery resource in a resource pool within each discovery time domain; and determines, according to the energy of each discovery resource, whether a proportion of a busy resource or an idle resource in each discovery time domain meets a corresponding reporting condition, generates a monitoring report by using the proportion of the busy resource or the idle resource when the reporting condition is met, and sends the monitoring report to a base station. This resolves a problem in the related technology that: because D2D user equipment cannot accurately obtain a quantity of resource collision times in a cell, the base station cannot accurately learn a resource status in the cell. Because the D2D user equipment may accurately monitor energy of a discovery resource, and determine a monitoring report according to the energy of the discovery resource, the monitoring report reported to the base station may relatively accurately reflect the resource status in the cell, and it is ensured that the base station can accurately learn the resource status in the cell.

Figure 5:
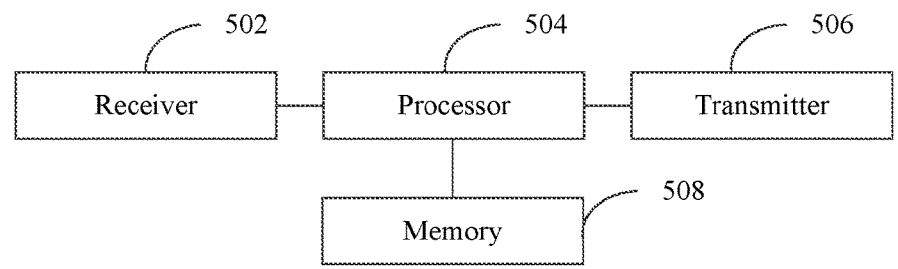
FIG. 5 is a schematic structural diagram of user equipment according to another embodiment of the present disclosure.

Referring to FIG. 5, FIG. 5 is a schematic structural diagram of user equipment according to another embodiment of the present disclosure. The user equipment is mainly applied to the user equipment 120 in the implementation environment shown in FIG. 1 as an example for description. The user equipment may include a receiver 502, a processor 504, a transmitter 506, and a memory 508, where the processor 504 is separately coupled to the receiver 502, the transmitter 506, and the memory 508, the memory 508 stores at least one type of computer application program, and the memory 508 may implement related functions according to these computer application programs.

The receiver 502 may be configured to receive a monitoring parameter broadcast by a base station, where the monitoring parameter includes an energy threshold corresponding to a busy resource, a reporting condition corresponding to the busy resource, an energy threshold corresponding to an idle resource, a reporting condition corresponding to the idle resource, a resource pool, and a discovery time domain used to indicate that the user equipment performs monitoring.

The processor 504 may be configured to monitor energy of at least one discovery resource in the resource pool within at least one discovery time domain.

The processor 504 may be further configured to determine a busy resource and an idle resource in the at least one discovery time domain according to the energy of the at least one discovery resource, the energy threshold corresponding to the busy resource, and the energy threshold corresponding to the idle resource.

The processor 504 may be further configured to generate a monitoring report when a proportion of the busy resource in a predetermined quantity of consecutive discovery time domains in the at least one discovery time domain meets the reporting condition corresponding to the busy resource, or when a proportion of the idle resource in consecutive discovery time domains in the at least one discovery time domain meets the reporting condition corresponding to the idle resource, where the monitoring report includes the proportion of the busy resource in the consecutive discovery time domains or the proportion of the idle resource in the consecutive discovery time domains.

The transmitter 506 may be configured to send the monitoring report to the base station.

In a first possible implementation manner of the embodiment shown in FIG. 5, the busy resource is a discovery resource whose energy is greater than the energy threshold corresponding to the busy resource, and the idle resource is a discovery resource whose energy is less than the energy threshold corresponding to the idle resource.

In a second possible implementation manner of the embodiment shown in FIG. 5, the processor 504 is further configured to calculate a proportion of the busy resource in each discovery time domain.

In a third possible implementation manner of the embodiment shown in FIG. 5, the processor 504 may be further configured to count a quantity of the busy resource and a quantity of the idle resource in each discovery time domain; and the processor 504 may be further configured to divide the quantity of the busy resource by a sum of the quantity of the busy resource and the quantity of the idle resource, to obtain the proportion of the busy resource in each discovery time domain; or the processor 504 may be further configured to count a quantity of the busy resource and a quantity of the idle resource in each subframe of each discovery time domain; the processor 504 may be further configured to: for each subframe, divide the quantity of the busy resource in each subframe by a sum of the quantity of the busy resource and the quantity of the idle resource, to obtain a proportion of the busy resource in each subframe; and the processor 504 may be further configured to calculate a weighted average value of the proportion of the busy resource in each subframe of each discovery time domain, to obtain the proportion of the busy resource in each discovery time domain.

In a fourth possible implementation manner of the embodiment shown in FIG. 5, the processor 504 may be further configured to calculate a proportion of the idle resource in each discovery time domain.

In a fifth possible implementation manner of the embodiment shown in FIG. 5, the processor 504 may be further configured to count a quantity of the busy resource and a quantity of the idle resource in each discovery time domain; and the processor 504 may be further configured to divide the quantity of the idle resource by a sum of the quantity of the busy resource and the quantity of the idle resource, to obtain the proportion of the idle resource in each discovery time domain; or the processor 504 may be further configured to count a quantity of the busy resource and a quantity of the idle resource in each subframe of each discovery time domain; the processor 504 may be further configured to divide the quantity of the idle resource in each subframe by a sum of the quantity of the busy resource and the quantity of the idle resource, to obtain a proportion of the idle resource in each subframe; and the processor 504 may be further configured to calculate a weighted average value of the proportion of the idle resource in each subframe of each discovery time domain, to obtain the proportion of the idle resource in each discovery time domain.

In a sixth possible implementation manner of the embodiment shown in FIG. 5, when the predetermined quantity is 1, the monitoring report includes the proportion of the busy resource in the discovery time domain or the proportion of the busy resource in the discovery time domain; or when the predetermined quantity is greater than 1, the monitoring report includes a weighted average value of the proportion of the busy resource in the predetermined quantity of consecutive discovery time domains or a weighted average value of the proportion of the idle resource in the predetermined quantity of consecutive discovery time domains.

In a seventh possible implementation manner of the embodiment shown in FIG. 5, the monitoring report further includes a quantity of success times and a quantity of failure times, the quantity of success times is obtained by counting a quantity of times of existence of idle resource selection in each discovery time domain, and the quantity of failure times is obtained by counting a quantity of times of nonexistence of idle resource selection in each discovery time domain.

In an eighth possible implementation manner of the embodiment shown in FIG. 5, the monitoring parameter further includes a predetermined probability threshold, the processor 504 may be further configured to generate a random number.

The transmitter 506 may be further configured to: when the random number is greater than the predetermined probability threshold, send the monitoring report to the base station.

In conclusion, the user equipment provided in this embodiment of the present disclosure monitors energy of each discovery resource in a resource pool within each discovery time domain; and determines, according to the energy of each discovery resource, whether a proportion of a busy resource or an idle resource in each discovery time domain meets a corresponding reporting condition, generates a monitoring report by using the proportion of the busy resource or the idle resource when the reporting condition is met, and sends the monitoring report to a base station. This resolves a problem in the related technology that: because D2D user equipment cannot accurately obtain a quantity of resource collision times in a cell, the base station cannot accurately learn a resource status in the cell. Because the D2D user equipment may accurately monitor energy of a discovery resource, and determine a monitoring report according to the energy of the discovery resource, the monitoring report reported to the base station may relatively accurately reflect the resource status in the cell, and it is ensured that the base station can accurately learn the resource status in the cell.

It should be noted that the division of the foregoing function modules is merely used as an example for description when the monitoring report generation apparatus and the user equipment that are provided in the foregoing embodiments generate a monitoring report. In practical application, the foregoing functions may be allocated to different function modules according to a requirement, that is, an internal structure of the user equipment is divided into different function modules for completing all or a part of functions described above. In addition, the monitoring report generation apparatus and the user equipment that are provided in the foregoing embodiments pertain to the same concept as that of the following monitoring report generation method embodiment; for a specific implementation process of the monitoring report generation apparatus and the user equipment, reference may be made to the method embodiment, and details are not described herein again.

Figure 6:
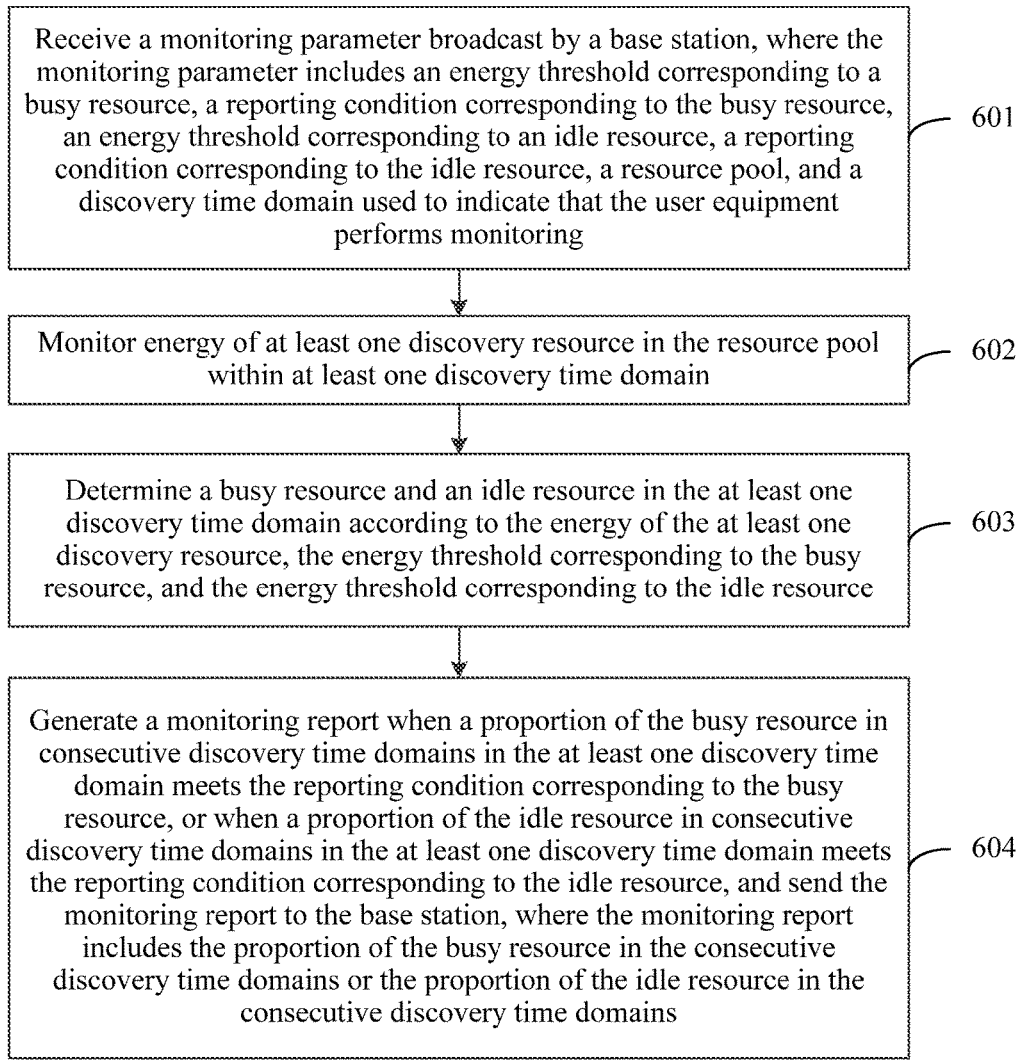
FIG. 6 is a method flowchart of a monitoring report generation method according to an embodiment of the present disclosure.

Referring to FIG. 6, FIG. 6 is a method flowchart of a monitoring report generation method according to an embodiment of the present disclosure. The monitoring report generation method is mainly applied to the user equipment 120 in the implementation environment shown in FIG. 1 as an example for description. The monitoring report generation method may include the following steps:

601. Receive a monitoring parameter broadcast by a base station, where the monitoring parameter includes an energy threshold corresponding to a busy resource, a reporting condition corresponding to the busy resource, an energy threshold corresponding to an idle resource, a reporting condition corresponding to the idle resource, a resource pool, and a discovery time domain used to indicate that the user equipment performs monitoring.

602. Monitor energy of at least one discovery resource in the resource pool within at least one discovery time domain.

603. Determine a busy resource and an idle resource in the at least one discovery time domain according to the energy of the at least one discovery resource, the energy threshold corresponding to the busy resource, and the energy threshold corresponding to the idle resource.

604. Generate a monitoring report when a proportion of the busy resource in consecutive discovery time domains in the at least one discovery time domain meets the reporting condition corresponding to the busy resource, or when a proportion of the idle resource in consecutive discovery time domains in the at least one discovery time domain meets the reporting condition corresponding to the idle resource, and send the monitoring report to the base station, where the monitoring report includes the proportion of the busy resource in the consecutive discovery time domains or the proportion of the idle resource in the consecutive discovery time domains.

In conclusion, according to the monitoring report generation method provided in this embodiment of the present disclosure, energy of each discovery resource in a resource pool is monitored within a discovery time domain; and it is determined, according to the energy of each discovery resource, whether a proportion of a busy resource or an idle resource in the discovery time domain meets a reporting condition, a monitoring report is generated by using the proportion of the busy resource or the idle resource when the reporting condition is met, and the monitoring report is sent to a base station. This resolves a problem in the related technology that: because D2D user equipment cannot accurately obtain a quantity of resource collision times in a cell, the base station cannot accurately learn a resource status in the cell. Because the D2D user equipment may accurately monitor energy of a discovery resource, and determine a monitoring report according to the energy of the discovery resource, the monitoring report reported to the base station may relatively accurately reflect the resource status in the cell, and it is ensured that the base station can accurately learn the resource status in the cell.

In an application scenario, when each user equipment monitors a discovery resource in a resource pool, if a proportion of a busy resource (or a proportion of a idle resource) monitored within a predetermined quantity of consecutive discovery time domains reaches a threshold that allows reporting, a monitoring report may be generated, and the monitoring report is reported to a base station. For a specific implementation process, reference may be made to the following description about FIG. 7A.

Figure 7A:
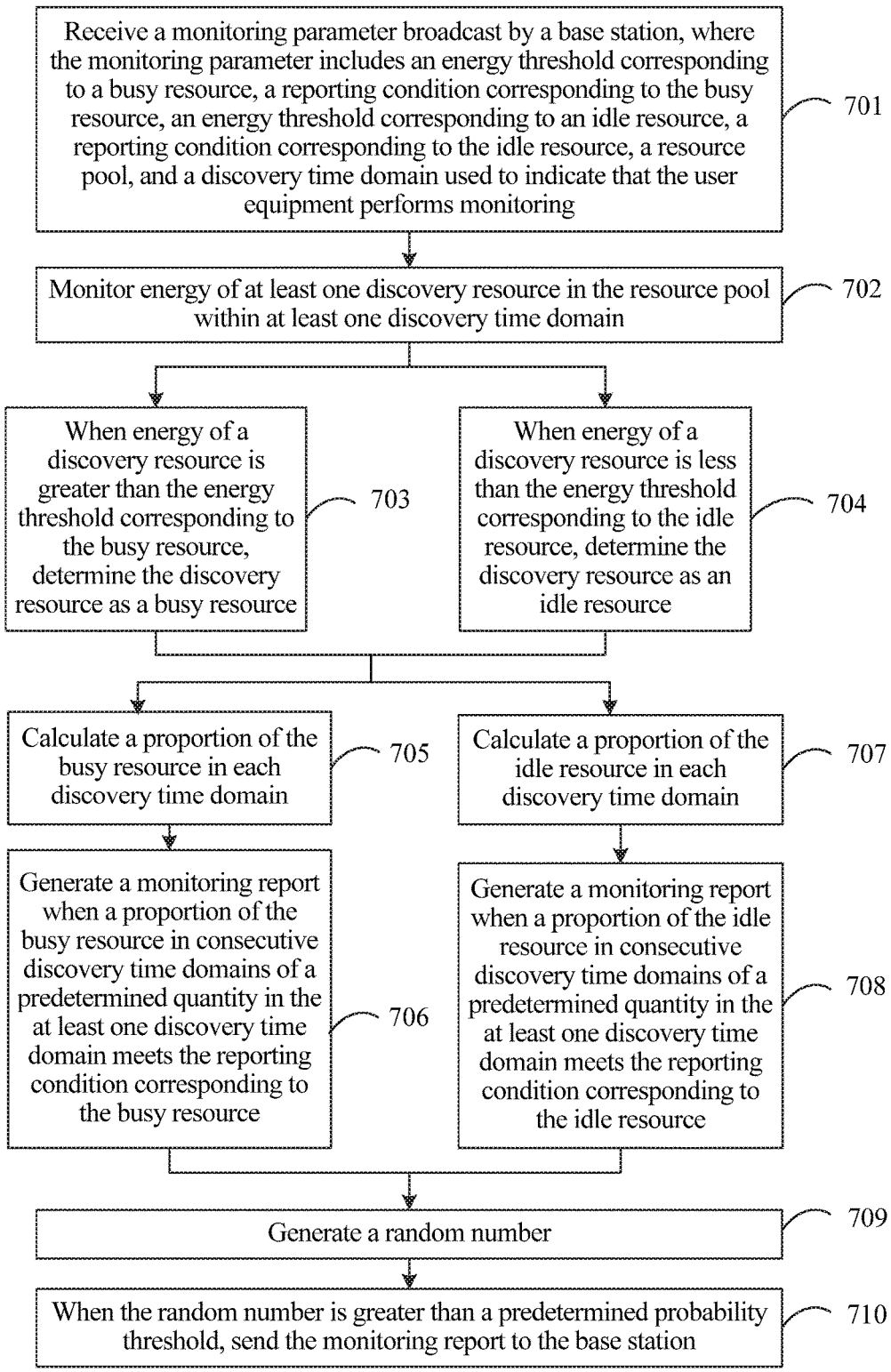
FIG. 7A is a method flowchart of a monitoring report generation method according to another embodiment of the present disclosure.

Referring to FIG. 7A, FIG. 7A is a method flowchart of a monitoring report generation method according to another embodiment of the present disclosure. The monitoring report generation method is mainly applied to the user equipment 120 in the implementation environment shown in FIG. 1 as an example for description. The monitoring report generation method may include the following steps:

701. Receive a monitoring parameter broadcast by a base station, where the monitoring parameter includes an energy threshold corresponding to a busy resource, a reporting condition corresponding to the busy resource, an energy threshold corresponding to an idle resource, a reporting condition corresponding to the idle resource, a resource pool, and a discovery time domain used to indicate that the user equipment performs monitoring.

In practical application, the base station may send the monitoring parameter to the user equipment by means of broadcast, where the monitoring parameter may include the energy threshold corresponding to the busy resource, the reporting condition, the energy threshold corresponding to the idle resource, the reporting condition, a parameter used for defining the resource pool, a parameter used for defining the discovery time domain, and the like. The user equipment may receive the monitoring parameter sent by the base station by means of broadcast.

Generally, the resource pool may be a set of frequency domains. For example, the parameter used for defining the resource pool may include a start resource block location and an end resource block location; or a defined start resource block location and a quantity of resource blocks.

The parameter used for defining the discovery time domain may include a frame number, a start subframe number, and an end subframe number; or may include a first parameter M and a second parameter N, that is, it indicates that N consecutive subframes in every M frames are a discovery time domain defined for discovering a service. Generally, the N consecutive subframes have a same time domain location in every M frames. For example, the N consecutive subframes are a subframe set formed by the $i^{th}$ subframe to the $(i+N-1)^{th}$ subframe.

Figure 7B:
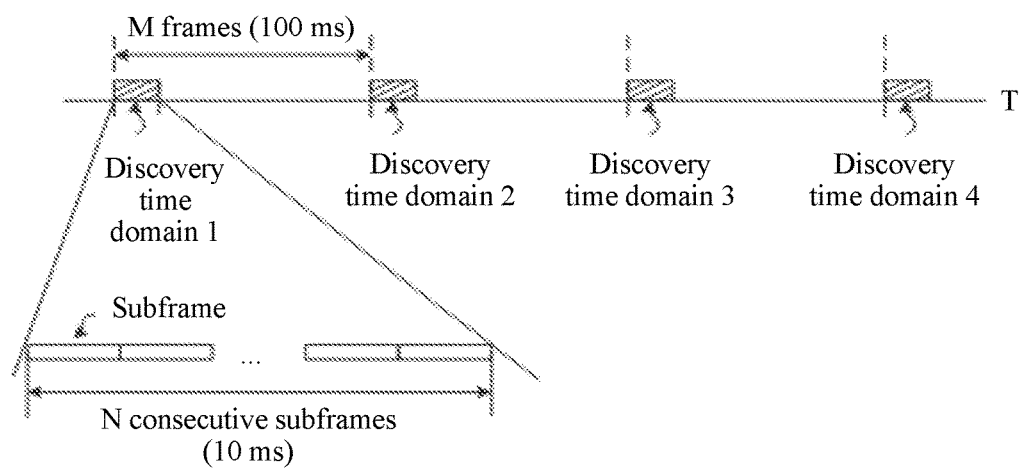
FIG. 7B is a schematic diagram of several discovery time domains according to some embodiments of the present disclosure.

Referring to FIG. 7B, FIG. 7B shows a schematic diagram of several discovery time domains according to some embodiments of the present disclosure. If the M frames are corresponding to 100 ms, and the N consecutive subframes are corresponding to 10 ms, 10 ms subsequent to each interval of 90 ms may be used as a discovery time domain. Herein, each discovery time domain may be set in a start location of the M frames. Apparently, alternatively, the discovery time domain may be set in another location in the M frames.

When the base station broadcasts the discovery time domain, the user equipment may monitor a discovery resource in the resource pool in these discovery time domains.

702. Monitor energy of at least one discovery resource in the resource pool within at least one discovery time domain.

After learning the resource pool and the discovery time domain according to the monitoring parameter, the user equipment may monitor the energy of the at least one discovery resource in the resource pool within the at least one discovery time domain.

703. When energy of a discovery resource is greater than the energy threshold corresponding to the busy resource, determine the discovery resource as a busy resource.

For a discovery resource, when the user equipment finds, by means of monitoring, that the energy of the discovery resource is greater than the energy threshold corresponding to the busy resource, the discovery resource is determined as a busy resource.

704. When energy of a discovery resource is less than the energy threshold corresponding to the idle resource, determine the discovery resource as an idle resource.

For a discovery resource, when the user equipment finds, by means of monitoring, that the energy of the discovery resource is less than the energy threshold corresponding to the idle resource, the discovery resource is determined as an idle resource.

705. Calculate a proportion of the busy resource in each discovery time domain.

A predetermined quantity may be one parameter added by the base station into the monitoring parameter that is sent by means of broadcast, and the base station may set the predetermined quantity according to an actual situation.

The predetermined quantity of consecutive discovery time domains refer to all discovery time domains in consecutive M frames of the predetermined quantity. When the predetermined quantity is 3, discovery time domain 1, discovery time domain 2, and discovery time domain 3 in FIG. 7B may be determined as the predetermined quantity of consecutive discovery time domains; and discovery time domain 2, discovery time domain 3, and discovery time domain 4 in FIG. 7B may also be determined as the predetermined quantity of consecutive discovery time domains. Apparently, alternatively, a value of the predetermined quantity herein may be 1, that is, only a proportion of the busy resource in one discovery time domain is calculated.

In practical application, the calculating a proportion of the busy resource in each discovery time domain may include the following two manners:

In a first manner, a quantity of the busy resource and a quantity of the idle resource in each discovery time domain are counted, and the quantity of the busy resource is divided by a sum of the quantity of the busy resource and the quantity of the idle resource, to obtain the proportion of the busy resource in each discovery time domain.

For example, a formula for calculating the proportion $R_m$ of the busy resource in the discovery time domain may be as follows:

$$R_m = S_m / (S_m + S_x),$$

where $S_m$ is a quantity of the busy resource counted in a discovery time domain, and $S_x$ is a quantity of the idle resource counted in a discovery time domain.

In a second manner, a quantity of the busy resource and a quantity of the idle resource in each subframe of each discovery time domain may be counted; the quantity of the busy resource in each subframe is divided by a sum of the quantity of the busy resource and the quantity of the idle resource, to obtain a proportion of the busy resource in each subframe; and a weighted average value of the proportion of the busy resource in each subframe in a same discovery time domain is calculated, to obtain the proportion of the busy resource in each discovery time domain.

That is, in the second manner, alternatively, when a proportion of the busy resource in a discovery time domain is obtained, the proportion of the busy resource in the discovery time domain may be obtained by counting the proportion of the busy resource in each subframe in the discovery time domain, and then performing weighted averaging on an obtained proportion corresponding to each subframe.

For example, a formula for calculating the proportion $R_m$ of the busy resource in one discovery time domain may be as follows:

$$R_m = \frac{\sum_{i=1}^{N} \alpha_{im} \cdot R_{im}}{N}, \text{ where } R_i = \frac{S_{im}}{S_{im} + S_{ix}},$$

and $R_{im}$ is a proportion of the busy resource in the $i^{th}$ subframe, $\alpha_{im}$ is a weight, in the discovery time domain, corresponding to a proportion of the busy resource in the $i^{th}$ subframe, N is a quantity of subframes in the discovery time domain, $S_{im}$ is a quantity of the busy resource in the $i^{th}$ subframe in the discovery time domain, and $S_{ix}$ is a quantity of the idle resource in the $i^{th}$ subframe in the discovery time domain.

Certainly, a process of calculating the proportion of the busy resource in a discovery time domain may be implemented by using another method, which is not described in detail again.

In practical application, when the value of the predetermined quantity is 1, the proportion of the busy resource in one discovery time domain may be obtained according to the foregoing process; or when the predetermined quantity is greater than 1, the proportion of the busy resource in the discovery time domains of the predetermined quantity may be obtained according to the foregoing process.

In a case in which the proportion of the busy resource is not large, the proportion of the busy resource generally does not affect resource scheduling. Therefore, to avoid occurrence of a resource congestion status caused by reporting by each user equipment in any case, filtering is generally performed, that is, step 706 is executed.

706. Generate a monitoring report when a proportion of the busy resource in a predetermined quantity of consecutive discovery time domains in the at least one discovery time domain meets the reporting condition corresponding to the busy resource.

The monitoring report includes the proportion of the busy resource in the consecutive discovery time domains.

In a possible implementation manner, that the proportion of the busy resource in the predetermined quantity of consecutive discovery time domains in the at least one discovery time domain meets the reporting condition corresponding to the busy resource may be as follows: the proportion of the busy resource in the predetermined quantity of consecutive discovery time domains in the at least one discovery time domain is greater than a proportion threshold corresponding to the busy resource.

In a scenario, the user equipment may generate the monitoring report when it is determined, in one discovery time domain, that the proportion of the busy resource is greater than the proportion threshold corresponding to the busy resource, where the monitoring report includes the proportion of the busy resource in the discovery time domain. That is, when the value of the predetermined quantity is 1, that is, for one discovery time domain, when the proportion of the busy resource in the discovery time domain is greater than the proportion threshold corresponding to the busy resource, the proportion of the busy resource in the discovery time domain is used as a part of the monitoring report.

Because monitoring in one discovery time domain cannot accurately reflect a current resource status, to improve reliability of reporting, and avoid resource congestion caused by reporting by the user equipment in each discovery time domain, monitoring results of monitoring in multiple consecutive discovery time domains may be counted. Therefore, in another scenario, monitoring results in multiple consecutive discovery time domains may be counted, and when a result of the counting meets the reporting condition, a monitoring report may be generated by using the result of the counting. That is, when the value of the predetermined quantity is greater than 1, that is, for the predetermined quantity of consecutive discovery time domains, when the proportion of the busy resource in the predetermined quantity of consecutive discovery time domains is greater than the proportion threshold corresponding to the busy resource, a weighted average value of the proportion of the busy resource in the predetermined quantity of consecutive discovery time domains, and the weighted average value of the proportion of the busy resource in the predetermined quantity of consecutive discovery time domains is determined as a part of the monitoring report.

For example, a formula for calculating the weighted average value $R_{jqm}$ of the proportion of the busy resource in the predetermined quantity of consecutive discovery time domains is as follows:

$$R_{jqm} = \sum_{j=1}^{P} \beta_{jm} R_{jm},$$

where

P is a value of a predetermined quantity, $R_{jm}$ is a proportion of the busy resource in the $j^{th}$ discovery time domain, and $\beta_{jm}$ is a weight corresponding to a proportion of the busy resource in the $j^{th}$ discovery time domain.

Apparently, when a weight of the weighted average value is 1, an arithmetic average value of the proportion of the busy resource in the predetermined quantity of consecutive discovery time domains may be further calculated, and the arithmetic average value is determined as a part of the monitoring report.

707. Calculate a proportion of the idle resource in each discovery time domain.

A predetermined quantity may be one parameter added by the base station into the monitoring parameter that is sent by means of broadcast, and the base station may set the predetermined quantity according to an actual situation.

The predetermined quantity of consecutive discovery time domains refer to all discovery time domains in consecutive M frames of the predetermined quantity. When the predetermined quantity is 3, discovery time domain 1, discovery time domain 2, and discovery time domain 3 in FIG. 7B may be determined as the predetermined quantity of consecutive discovery time domains; and discovery time domain 2, discovery time domain 3, and discovery time domain 4 in FIG. 7B may also be determined as the predetermined quantity of consecutive discovery time domains. Apparently, alternatively, a value of the predetermined quantity herein may be 1, that is, only a proportion of the idle resource in one discovery time domain is calculated.

In practical application, the calculating a proportion of the idle resource in each discovery time domain may include the following two manners:

In a first manner, a quantity of the busy resource and a quantity of the idle resource in each discovery time domain are counted, and the quantity of the idle resource is divided by a sum of the quantity of the busy resource and the quantity of the idle resource, to obtain the proportion of the idle resource in each discovery time domain.

For example, a formula for calculating the proportion $R_x$ of the idle resource in the discovery time domain may be as follows:

$$R_x = S_x / (S_m + S_x),$$

where $S_m$ is a quantity of the busy resource counted in a discovery time domain, and $S_x$ is a quantity of the idle resource counted in a discovery time domain.

In a second manner, a quantity of the busy resource and a quantity of the idle resource in each subframe of each discovery time domain may be counted; the quantity of the idle resource in each subframe is divided by a sum of the quantity of the busy resource and the quantity of the idle resource, to obtain a proportion of the idle resource in each subframe; and a weighted average value of the proportion of the idle resource in each subframe in a same discovery time domain is calculated, to obtain the proportion of the idle resource in each discovery time domain.

That is, in the second manner, when a proportion of the idle resource in a discovery time domain is obtained, the proportion of the idle resource in the discovery time domain may be obtained by counting the proportion of the idle resource in each subframe in the discovery time domain, and then performing weighted averaging on an obtained proportion corresponding to each subframe.

For example, a formula for calculating the proportion $R_x$ of the idle resource in one discovery time domain may be as follows:

$$R_x = \frac{\sum_{i=1}^{N} \alpha_{ix} \cdot R_{ix}}{N}, \text{ where } R_i = \frac{S_{im}}{S_{im} + S_{ix}},$$

and $R_{ix}$ is a proportion of the idle resource in the $i^{th}$ subframe, $\alpha_{ix}$ is a weight, in the discovery time domain, corresponding to a proportion of the idle resource in the $i^{th}$ subframe, N is a quantity of subframes in the discovery time domain, $S_{im}$ is a quantity of the busy resource in the $i^{th}$ subframe in the discovery time domain, and $S_{ix}$ is a quantity of the idle resource in the $i^{th}$ subframe in the discovery time domain.

Certainly, a process of calculating the proportion of the idle resource in a discovery time domain may be implemented by using another method, which is not described in detail again.

In practical application, when the value of the predetermined quantity is 1, the proportion of the idle resource in one discovery time domain may be obtained according to the foregoing process; or when the predetermined quantity is greater than 1, the proportion of the idle resource in the discovery time domains of the predetermined quantity may be obtained according to the foregoing process.

In a case in which the proportion of the idle resource is not large, the proportion of the idle resource generally does not affect resource scheduling. Therefore, to avoid occurrence of a resource congestion status caused by reporting by each user equipment in any case, filtering is generally performed, that is, step 708 is executed.

708. Generate a monitoring report when a proportion of the idle resource in a predetermined quantity of consecutive discovery time domains in the at least one discovery time domain meets the reporting condition corresponding to the idle resource.

The monitoring report includes the proportion of the idle resource in the consecutive discovery time domains.

In a possible implementation manner, that the proportion of the idle resource in the predetermined quantity of consecutive discovery time domains in the at least one discovery time domain meets the reporting condition corresponding to the idle resource may be as follows: the proportion of the idle resource in the predetermined quantity of consecutive discovery time domains in the at least one discovery time domain is greater than a proportion threshold corresponding to the idle resource.

In a scenario, the user equipment may generate the monitoring report when it is determined, in one discovery time domain, that the proportion of the idle resource is greater than the proportion threshold corresponding to the idle resource, where the monitoring report includes the proportion of the idle resource in the discovery time domain. That is, when the value of the predetermined quantity is 1, that is, for one discovery time domain, when the proportion of the idle resource in the discovery time domain is greater than the proportion threshold corresponding to the idle resource, the proportion of the idle resource in the discovery time domain is used as a part of the monitoring report.

Because monitoring in one discovery time domain cannot accurately reflect a current resource status, to improve reliability of reporting, and avoid resource congestion caused by reporting by the user equipment in each discovery time domain, monitoring results of monitoring in multiple consecutive discovery time domains may be counted. Therefore, in another scenario, monitoring results in multiple consecutive discovery time domains may be counted, and when a result of the counting meets the reporting condition, a monitoring report may be generated by using the result of the counting. That is, when the value of the predetermined quantity is greater than 1, that is, for the predetermined quantity of consecutive discovery time domains, when the proportion of the idle resource in the predetermined quantity of consecutive discovery time domains is greater than the proportion threshold corresponding to the idle resource, a weighted average value of the proportion of the idle resource in the predetermined quantity of consecutive discovery time domains, and the weighted average value of the proportion of the idle resource in the predetermined quantity of consecutive discovery time domains is determined as a part of the monitoring report.

For example, a formula for calculating the weighted average value $R_{jqx}$ of the proportion of the idle resource in the predetermined quantity of consecutive discovery time domains is as follows:

$$R_{jqx} = \sum_{j=1}^{P} \beta_{jx} R_{jx},$$

where

P is a value of a predetermined quantity, $R_{jx}$ is a proportion of the idle resource in the $j^{th}$ discovery time domain, and $\beta_{jx}$ is a weight corresponding to a proportion of the idle resource in the $j^{th}$ discovery time domain.

Apparently, when a weight of the weighted average value is 1, an arithmetic average value of the proportion of the idle resource in the predetermined quantity of consecutive discovery time domains may be further calculated, and the arithmetic average value is determined as a part of the monitoring report.

709. Generate a random number.

In the predetermined quantity of consecutive discovery time domains, possibly, the proportion of the busy resource or the proportion of the idle resource that is monitored by user equipment of a relatively large quantity may meet a probability reporting condition. Therefore, all these user equipments have reporting permission to perform reporting on the base station. However, in practical application, a relatively large quantity of user equipment may exist in a cell. In the consecutive discovery time domains of the predetermined quantity, a relatively large quantity of user equipment that has reporting permission may also exist. For example, 100 user equipments that have reporting permission may exist. In this case, if all these user equipments perform reporting on the base station, a relatively large quantity of resources may be occupied, and the base station may generally learn a current resource status in the cell according to only a result of reporting by 20 user equipments in the 100 user equipments. Therefore, for user equipment that has reporting permission, when reporting is performed, a random number may be first generated, and a quantity of user equipment that can perform actual reporting is limited to a value or to be less than a value by means of a limitation of the random number.

710. When the random number is greater than a predetermined probability threshold, send the monitoring report to the base station.

The predetermined probability threshold may be one parameter added by the base station into the monitoring parameter that is sent by means of broadcast, that is, the monitoring parameter may further include the predetermined probability threshold. The base station may set a value of the random number according to a quantity of user equipment and a resource status in the cell.

The monitoring report may be sent to the base station only when the random number generated by the user equipment is greater than the predetermined probability threshold, and the monitoring report is not sent to the base station when the random number generated by the user equipment is less than the predetermined probability threshold. In this way, for a relatively large quantity of user equipment in the cell, because of a limitation of the random number, only a part of user equipment that has reporting permission may actually send the monitoring report to the base station, so that occupation on resources may be effectively reduced.

It should be additionally noted that, in practical application, to ensure that scheduling of a resource in the cell may be relatively accurately implemented after the base station learns the monitoring report, when the monitoring report is generated, the user equipment may further add other monitored related information to the monitoring report, so that the base station uses the other monitored related information as reference when scheduling of a resource is implemented.

In a possible implementation manner, that a result of counting an idle resource may be determined as a part of the monitoring report may specifically include the following: in one discovery time domain, a quantity of times of existence of idle resource selection is counted to obtain a quantity of success times; in the discovery time domain, a quantity of times of nonexistence of idle resource selection is counted to obtain a quantity of failure times; the quantity of success times and the quantity of failure times are determined as a part of the monitoring report. That is, the monitoring report may further include the quantity of success times and the quantity of failure times, the quantity of success times is obtained by counting a quantity of times of existence of idle resource selection in each discovery time domain, and the quantity of failure times is obtained by counting a quantity of times of nonexistence of idle resource selection in each discovery time domain.

That is, when monitoring a discovery resource, in an entire monitoring process, the user equipment may add a monitored idle resource to an idle resource list, and when an SMS message needs to be sent by using an idle resource, may search the idle resource list for an available idle resource. When a selectable idle resource exists, 1 may be added to the quantity of success times, or when a selectable idle resource does not exist, 1 may be added to the quantity of failure times. Finally, in the entire monitoring process, the counted quantity of success times and the counted quantity of failure times are determined as a part of the monitoring report. The monitoring process described herein includes a monitoring process starting from a discovery time domain for starting monitoring to a discovery time domain in which it is counted that there are the predetermined quantity of consecutive discovery time domains in which the proportion of the busy resource or the idle resource meets the reporting condition.

For example, still referring to FIG. 7B, if a monitoring process starts from discovery time domain 1, the value of the predetermined quantity is 3. When it is found, by means of monitoring, that a proportion of the busy resource in discovery time domain 2, a proportion of the busy resource in discovery time domain 3, and a proportion of the busy resource in discovery time domain 4 meet the reporting condition corresponding to the busy resource, the entire monitoring process includes discovery time domain 1 to discovery time domain 4. When the quantity of success times and the quantity of failure times are counted, values of these two parameters are accumulated continuously in four discovery time domains: discovery time domain 1, discovery time domain 2, discovery time domain 3, and discovery time domain 4; and finally, a quantity of success times obtained by means of accumulation in the four discovery time domains and a quantity of failure times obtained by means of accumulation in the four discovery time domains as a part of the monitoring report. Apparently, only the quantity of success times obtained by means of accumulation may be used as a part of the monitoring report, or only the quantity of failure times obtained by means of accumulation may be used as a part of the monitoring report.

In conclusion, according to the monitoring report generation method provided in this embodiment of the present disclosure, energy of each discovery resource in a resource pool is monitored within a discovery time domain; and it is determined, according to the energy of each discovery resource, whether a proportion of a busy resource or an idle resource in the discovery time domain meets a corresponding reporting condition, a monitoring report is generated by using the proportion of the busy resource or the idle resource when the reporting condition is met, and the monitoring report is sent to a base station. This resolves a problem in the related technology that: because D2D user equipment cannot accurately obtain a quantity of resource collision times in a cell, the base station cannot accurately learn a resource status in the cell. Because the D2D user equipment may accurately monitor energy of a discovery resource, and determine a monitoring report according to the energy of the discovery resource, the monitoring report reported to the base station may relatively accurately reflect the resource status in the cell, and it is ensured that the base station can accurately learn the resource status in the cell.

It should be additionally noted that step 701, step 702, step 703, step 704, step 705, step 706, step 709, and step 710 may be separately implemented as a monitoring report generation method, or step 701, step 702, step 703, step 704, step 707, step 708, step 709, and step 710 may be separately implemented as a monitoring report generation method.

Persons of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of the present disclosure.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division may merely be logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementation manners of the present disclosure, but are not intended to limit the protection scope of the present disclosure. Any variation or replacement readily figured out by persons skilled in the art within the technical scope disclosed in the present disclosure shall fall within the protection scope of the present disclosure. Therefore, the protection scope of the present disclosure shall be subject to the protection scope of the claims.

What is claimed is:

1. User equipment, wherein the user equipment is in a device-to-device (D2D) communications system, and the user equipment comprises a receiver, a processor, and a transmitter, wherein:

the receiver is configured to receive a monitoring parameter broadcast by a base station, wherein the monitoring parameter comprises an energy threshold corresponding to a busy resource, a reporting condition corresponding to the busy resource, an energy threshold corresponding to an idle resource, a reporting condition corresponding to the idle resource, a resource pool, and a discovery time domain used to indicate that the user equipment performs monitoring;

the processor is configured to monitor energy of at least one discovery resource in the resource pool within the at least one discovery time domain;

the processor is further configured to determine a busy resource and an idle resource in the at least one discovery time domain according to the energy of the at least one discovery resource, the energy threshold corresponding to the busy resource, and/or the energy threshold corresponding to the idle resource;

the processor is further configured to generate a monitoring report when a proportion of the busy resource in a predetermined quantity of consecutive discovery time domains in the at least one discovery time domain meets the reporting condition corresponding to the busy resource, or when a proportion of the idle resource in consecutive discovery time domains in the at least one discovery time domain meets the reporting condition corresponding to the idle resource, wherein the monitoring report comprises the proportion of the busy resource in the consecutive discovery time domains or the proportion of the idle resource in the consecutive discovery time domains; and the transmitter is configured to send the monitoring report to the base station.

2. The user equipment according to claim 1, wherein the busy resource is a discovery resource whose energy is greater than the energy threshold corresponding to the busy resource, and the idle resource is a discovery resource whose energy is less than the energy threshold corresponding to the idle resource.

3. The user equipment according to claim 2, wherein the processor is further configured to calculate a proportion of the busy resource in each discovery time domain.

4. The user equipment according to claim 3, wherein the processor is further configured to count a quantity of the busy resource and a quantity of the idle resource in each discovery time domain; and the processor is further configured to divide the quantity of the busy resource by a sum of the quantity of the busy resource and the quantity of the idle resource, to obtain the proportion of the busy resource in each discovery time domain; or the processor is further configured to count a quantity of the busy resource and a quantity of the idle resource in each subframe of each discovery time domain; the processor is further configured to divide the quantity of the busy resource in each of all the subframes by a sum of the quantity of the busy resource and the quantity of the idle resource, to obtain a proportion of the busy resource in each of all the subframes; and the processor is further configured to calculate a weighted average value of the proportion of the busy resource in each subframe of each discovery time domain, to obtain the proportion of the busy resource in each discovery time domain.

5. The user equipment according to claim 2, wherein the processor is further configured to calculate a proportion of the idle resource in each discovery time domain.

6. The user equipment according to claim 5, wherein the processor is further configured to count a quantity of the busy resource and a quantity of the idle resource in each discovery time domain; and the processor is further configured to divide the quantity of the idle resource by a sum of the quantity of the busy resource and the quantity of the idle resource, to obtain the proportion of the idle resource in each discovery time domain; or the processor is further configured to count a quantity of the busy resource and a quantity of the idle resource in each subframe of each discovery time domain; the processor is further configured to divide the quantity of the idle resource in each of all the subframes by a sum of the quantity of the busy resource and the quantity of the idle resource, to obtain a proportion of the idle resource in each of all the subframes; and the processor is further configured to calculate a weighted average value of the proportion of the idle resource in each subframe of each discovery time domain, to obtain the proportion of the idle resource in each discovery time domain.

7. The user equipment according to claim 1, wherein the monitoring report further comprises a quantity of success times and a quantity of failure times, the quantity of success times is obtained by counting a quantity of times of existence of idle resource selection in each discovery time domain, and the quantity of failure times is obtained by counting a quantity of times of nonexistence of idle resource selection in each discovery time domain.

8. The user equipment according to claim 1, wherein the monitoring parameter further comprises a predetermined probability threshold, the processor is further configured to generate a random number; and the transmitter is further configured to: when the random number is greater than the predetermined probability threshold, send the monitoring report to the base station.

9. A monitoring report generation method, applied to user equipment in a device-to-device (D2D) communications system, wherein the method comprises:

receiving a monitoring parameter broadcast by a base station, wherein the monitoring parameter comprises an energy threshold corresponding to a busy resource, a reporting condition corresponding to the busy resource, an energy threshold corresponding to an idle resource, a reporting condition corresponding to the idle resource, a resource pool, and a discovery time domain used to indicate that the user equipment performs monitoring;

monitoring energy of at least one discovery resource in the resource pool within the at least one discovery time domain;

determining a busy resource and an idle resource in the at least one discovery time domain according to the energy of the at least one discovery resource, the energy threshold corresponding to the busy resource, and the energy threshold corresponding to the idle resource; and generating a monitoring report when a proportion of the busy resource in consecutive predetermined-quantity discovery time domains in the at least one discovery time domain meets the reporting condition corresponding to the busy resource, or when a proportion of the idle resource in consecutive discovery time domains in the at least one discovery time domain meets the reporting condition corresponding to the idle resource, and sending the monitoring report to the base station, wherein the monitoring report comprises the proportion of the busy resource in the consecutive discovery time domains or the proportion of the idle resource in the consecutive discovery time domains.

10. The method according to claim 9, wherein the busy resource is a discovery resource whose energy is greater than the energy threshold corresponding to the busy resource, and the idle resource is a discovery resource whose energy is less than the energy threshold corresponding to the idle resource.

11. The method according to claim 10, wherein after the determining a busy resource and an idle resource in the at least one discovery time domain, the method further comprises:

calculating a proportion of the busy resource in each discovery time domain.

12. The method according to claim 9, wherein:

when the predetermined quantity is 1, the monitoring report comprises the proportion of the busy resource in the discovery time domain or the proportion of the busy resource in the discovery time domain; or when the predetermined quantity is greater than 1, the monitoring report comprises a weighted average value of the proportion of the busy resource in the predetermined quantity of consecutive discovery time domains or a weighted average value of the proportion of the idle resource in the predetermined quantity of consecutive discovery time domains.

13. The method according to claim 9, wherein the monitoring report further comprises a quantity of success times and a quantity of failure times, the quantity of success times is obtained by counting a quantity of times of existence of idle resource selection in each discovery time domain, and the quantity of failure times is obtained by counting a quantity of times of nonexistence of idle resource selection in each discovery time domain.

14. The method according to claim 9, wherein the monitoring parameter further comprises a predetermined probability threshold, and the method further comprises:

generating a random number; and when the random number is greater than the predetermined probability threshold, executing the step of sending the monitoring report to the base station.

* * * * *